J. HUNSBERGER,

Assignor to R. Hoffheins.

HORSE-RAKE.

No. 7,745. Reissued June 12, 1877.

*WITNESSES:*

C. Clarence Poole

D. P. Cowl

*INVENTOR:*

Jonathan Hunsberger

By his atty

R. D. Smith.

N. PETERS, PHOTO-LITHOGRAPHER, WASHINGTON, D. C.

UNITED STATES PATENT OFFICE.

JONATHAN HUNSBERGER, OF WORCESTER TOWNSHIP, MONTGOMERY COUNTY, ASSIGNOR TO REUBEN HOFFHEINS, OF YORK, PA.

IMPROVEMENT IN HORSE-RAKES.

Specification forming part of Letters Patent No. 78,969, dated June 16, 1868; reissue No. 7,745, dated June 12, 1877; application filed May 8, 1877.

DIVISION A.

*To all whom it may concern:*

Be it known that I, JONATHAN HUNSBERGER, of Worcester township, in the county of Montgomery and State of Pennsylvania, have invented a new and useful Improvement in Horse Hay-Rakes; and I do hereby declare that the following is a full, clear, and exact description thereof, which will enable others skilled in the art to make and use the same, reference being had to the accompanying drawings, forming part of this specification.

Figure 1:
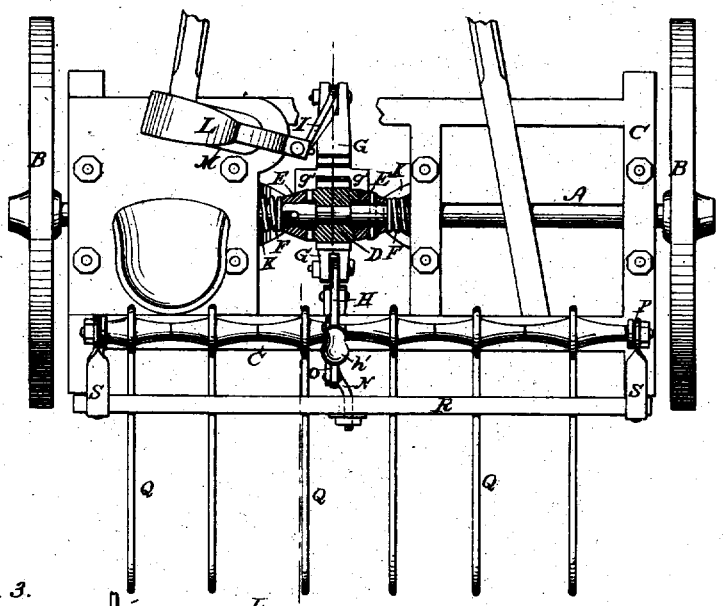
Figure 3:
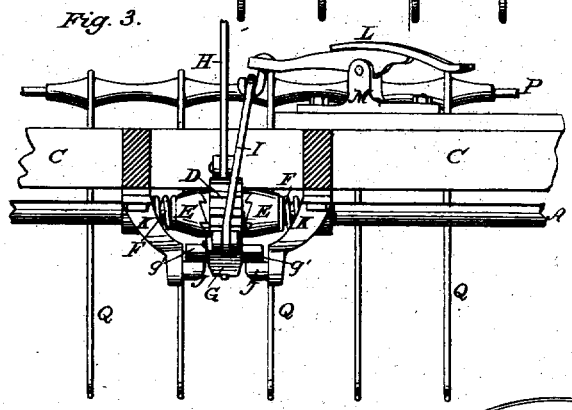
Figure 2:
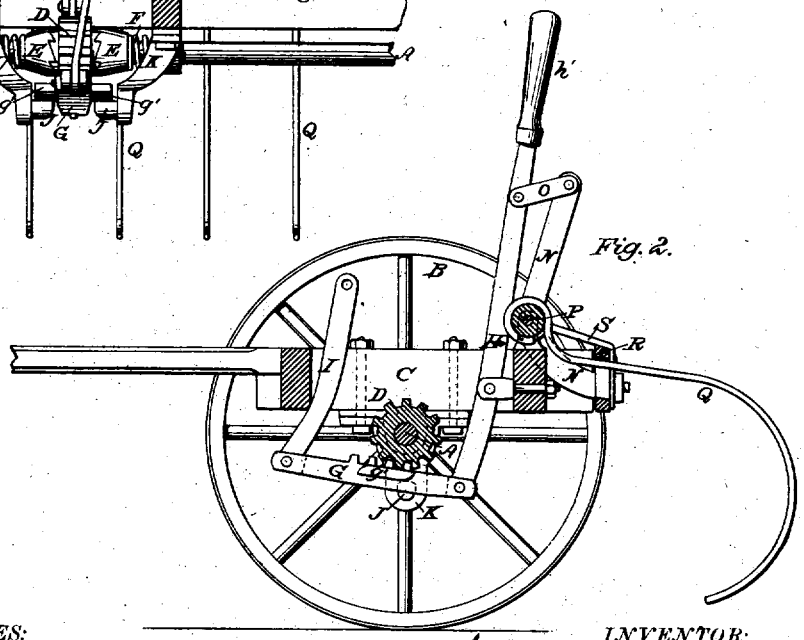

Figure 1 is a top view of a horse hay-rake to which my improvement has been attached. Fig. 2 is a cross-section of the same, taken through the line *x x*, Fig. 1. Fig. 3 is a detail view of the same.

Similar letters of reference indicate corresponding parts.

The object of my invention, as set forth and secured in this patent, is to make available, for the purpose of dumping the rake, the power of the animal which draws the same; and it therefore consists, first, in mechanism connected with the shaft of the rake-head, which may, at will, be caused to engage with one or both of the wheel-shafts, to produce partial rotation of said rake-head; second, in plates or disks attached to the proximate ends of the said wheel-shafts, to increase the diameter of the shaft at the point of engagement with the device attached to the rake-head to produce the required rotation; third, in plates or disks attached to the proximate ends of the wheel-shafts, and kept in place by springs, to produce an elastic engagement with the device attached to the rake-head to produce a partial rotation of the same.

That others may fully understand, I will proceed to describe a practical method of carrying my said invention into effect, without, however, designing to limit myself to the details of structure shown or described.

A is the axle of the rake, to which the wheels B are rigidly attached, so as to carry the parts of the said axle with them in their revolution. The axle A revolves in bearings attached to the frame C. The inner ends of the parts of the axle A enter and work in the hole through the cog-wheel D. E are two sliding clutches, placed upon the parts of the axle A in such positions as to take hold of the clutches formed upon the sides of the cog-wheel D, against which they are held by the action of the springs F coiled around and attached to the said parts of the axle. By this construction the wheels B can act independently of each other, the cog-wheel D being carried forward by the revolution of whichever wheel may be advancing, the clutch of the wheel that may be stationary or revolving backward sliding over the cog-wheel D, so that the rake may be easily turned in either direction. G is a toothed rack-bar, the rear end of which is pivoted to the lower end of the lever H, and its forward end to the lower end of the connecting-bar I, as shown in Fig. 2. Upon the side edges of the rack-bar G are formed flanges *g'*, which, when the rack G is moving back in contact with the cog-wheel D, slide upon the blocks J attached to the inner sides of the arms K, which are attached to the frame C, as shown in Fig. 3. The upper end of the connecting-rod I is pivoted to the end of the foot-lever L, which is pivoted to the standard M attached to the frame C, and the free end of which extends out into such a position that it may be easily reached and operated by the driver with his foot to raise the rack G into contact with the cog-wheel D. The lever H is pivoted to the frame C, and its upper part is connected with the upper end of the bent lever N by the connecting-bar O, as shown in Fig. 2. The bent lever N is pivoted at its angle to the shaft P, to which the rake-teeth Q are pivoted, and its lower end is attached to the bar R through slots, in which the rake-teeth Q pass, and which is connected and pivoted to the shaft P by the arms S, so that by raising the bar R the rake-teeth Q will be raised to drop the collected hay, while, at the same time, each tooth may rise independently should it encounter an obstruction. The upper end of the lever H may be extended, and may have a handle, *h'*, formed upon or attached to it, so that the driver may raise the rake-teeth by hand, and instantaneously, should occasion require it to be raised.

Having described my invention, what I claim as new is—

1. The divided shaft A A and the wheels B

B, secured thereto, combined with the rake-shaft P and connecting mechanism, whereby said shaft P may, at the will of the driver, be coupled with said revolving shafts A, to cause a rotation of said rake, substantially as set forth.

2. The wheels B B, secured, severally, to the free ends of the divided axle A A, and the rake-shaft P, combined with plates or disks secured to the proximate ends of said axles, and an intermediate device engaging with said disks, whereby the motion of said axles may be transmitted to said rake-head, for the purpose set forth.

3. The wheels B B, severally secured to the ends of the divided axle A A, and the rake-shaft P, combined with movable plates or disks on the proximate ends of axles A A, said plates being sustained by springs with an elastic pressure against an intermediate device engaging with said disks, whereby said disks become self-adjusting, to transmit the motion of one or both of said axles to said rake-head, as set forth.

JONATHAN HUNSBERGER.

Witnesses:

WM. F. HALLMAN,

ABRAM S. GELLER.